United States Patent
Kim et al.

(10) Patent No.: US 11,392,936 B2
(45) Date of Patent: Jul. 19, 2022

(54) EXCHANGE SERVICE ROBOT AND EXCHANGE SERVICE METHOD USING THE SAME

(71) Applicant: LG ELECTRONICS INC., Seoul (KR)

(72) Inventors: Hyongguk Kim, Seoul (KR); Jaeyoung Kim, Seoul (KR); Hyoungmi Kim, Seoul (KR); Yujune Jang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 366 days.

(21) Appl. No.: 16/486,329

(22) PCT Filed: Jun. 21, 2019

(86) PCT No.: PCT/KR2019/007537
§ 371 (c)(1),
(2) Date: Aug. 15, 2019

(87) PCT Pub. No.: WO2020/256194
PCT Pub. Date: Dec. 24, 2020

(65) Prior Publication Data
US 2021/0365933 A1 Nov. 25, 2021

(51) Int. Cl.
*G06Q 20/38* (2012.01)
*B25J 5/00* (2006.01)
(Continued)

(52) U.S. Cl.
CPC ............ *G06Q 20/381* (2013.01); *B25J 5/007* (2013.01); *B25J 11/008* (2013.01); *B25J 13/00* (2013.01);
(Continued)

(58) Field of Classification Search
CPC . B25J 5/007; B25J 11/008; B25J 13/00; B25J 5/00; B25J 9/162; G05B 19/4155;
(Continued)

(56) References Cited

U.S. PATENT DOCUMENTS

| 2016/0252893 A1* | 9/2016 | Kamyshnikov | G05B 19/106 700/231 |
| 2019/0224852 A1* | 7/2019 | Choi | B25J 19/00 |
| 2019/0240839 A1* | 8/2019 | Jung | B25J 13/06 |

FOREIGN PATENT DOCUMENTS

| CN | 107584500 | | 1/2018 | |
| GB | 2551752 A | * | 1/2018 | G07F 19/201 |

(Continued)

OTHER PUBLICATIONS

PCT International Application No. PCT/KR2019/007537, Written Opinion of the International Searching Authority dated Mar. 23, 2020, 12 pages.

*Primary Examiner* — Khoi H Tran
*Assistant Examiner* — Tanner L Cullen
(74) *Attorney, Agent, or Firm* — Lee, Hong, Degerman, Kang & Waimey PC

(57) ABSTRACT

An exchange service robot includes a communication unit, a traveling unit including at least one wheel and a traveling motor, an output unit configured to output a request for putting a currency, a currency recognition sensor configured to recognize the amount of currency put through a currency slot, and a processor configured to acquire information on a withdrawal amount based on exchange rate information between the put currency and a currency to be withdrawn and the amount of put currency, and provide the currency to be withdrawn based on the acquired information.

18 Claims, 8 Drawing Sheets

(51) Int. Cl.
*B25J 13/00* (2006.01)
*B25J 11/00* (2006.01)
*G05B 19/4155* (2006.01)

(52) U.S. Cl.
CPC .............. *G05B 19/4155* (2013.01); *G05B 2219/50391* (2013.01)

(58) Field of Classification Search
CPC ....... G05B 2219/50391; G06Q 20/381; G06Q 40/04; G06Q 50/30; G06Q 40/02; G07F 19/00; G07D 1/00
See application file for complete search history.

(56) References Cited

FOREIGN PATENT DOCUMENTS

| | | | | |
|---|---|---|---|---|
| JP | H06036229 | | 5/1994 | |
| JP | H08329286 | | 12/1996 | |
| KR | 20090064819 A | * | 6/2009 | ............. G06Q 40/00 |
| KR | 1020090064819 | | 6/2009 | |
| KR | 20120031274 A | * | 4/2012 | ............... B60N 3/02 |
| KR | 20120098257 A | * | 9/2012 | ............... B25J 5/00 |
| KR | 1020120098257 | | 9/2012 | |
| KR | 20150127348 A | * | 11/2015 | ............... G07D 1/04 |

* cited by examiner

EXCHANGE SERVICE ROBOT AND EXCHANGE SERVICE METHOD USING THE SAME

CROSS-REFERENCE TO RELATED APPLICATIONS

This application is the National Stage filing under 35 U.S.C. 371 of International Application No. PCT/KR2019/007537, filed on Jun. 21, 2019, the contents of which are hereby incorporated by reference herein in its entirety.

FIELD

The present invention relates to an exchange service robot and an exchange service method using the same.

BACKGROUND

A robot may refer to a machine that automatically processes or operates a given task by its own ability. Robot application fields may be generally classified into various fields including an industrial field, a medical field, an aerospace field and an ocean field.

Recently, with development of self-driving technology, automatic control technology using sensors and communication technology, research into application of robots to various fields is ongoing.

For example, robots disposed in various transportation management facilities such as airports, railway stations, bus terminals, etc. to provide users with information related to use of transporters or guidance services have appeared. Such robots may autonomously travel in various areas of the transportation management facilities or may be disposed at predetermined places to perform various functions for convenience of the users.

Meanwhile, recently, with economic development and diffusion of low-cost overseas transporters, the number of travelers enjoying oversea trip has rapidly increased. Travelers exchange currencies for local currencies at the time of oversea trip and use the local currencies during travel.

The travelers may re-exchange the remaining currencies for their country's currencies after travel. However, it may be inconvenient for the travelers to visit a bank for re-exchange. In addition, many travelers may leave a small amount of remaining currencies in their home without re-exchange, and economic loss caused thereby is not negligible.

SUMMARY

An object of the present invention devised to solve the problem lies in an exchange service robot disposed in an overseas transportation facility such as an airport to provide a convenient exchange service to users, and an exchange service method.

Another object of the present invention devised to solve the problem lies in an exchange service robot capable of providing more intelligently and efficiently an exchange service in the overseas transportation management facility, and an exchange service method.

An exchange service robot according to an embodiment of the present invention includes a communication unit, a traveling unit including at least one wheel and a traveling motor, an output unit configured to output a request for putting a currency, a currency recognition sensor configured to recognize the amount of currency put through a currency slot, and a processor configured to acquire information on a withdrawal amount based on exchange rate information between the put currency and a currency to be withdrawn and the amount of put currency, and provide the currency to be withdrawn based on the acquired information.

In some embodiments, the exchange service robot may further include an input unit configured to receive input of selecting a type of the currency to be withdrawn, and the type of the currency to be withdrawn may include at least one of a real currency available in at least one country, an electronic currency, a virtual currency, a cryptocurrency, mileage or points.

In some embodiments, when the currency of the type selected through the input unit is a real currency, the processor may perform control such that the real currency corresponding to the withdrawal amount is withdrawn through a currency outlet.

In some embodiments, when the currency of the selected type is not a real currency, the processor may transmit information on the withdrawal amount to an exchange service operation apparatus to transfer the currency corresponding to the withdrawal amount to an account of a user related to the currency of the selected type.

In some embodiments, the processor may transmit information including the amount of put currency and the type of the currency to be withdrawn to an exchange service operation apparatus, receive information on the calculated withdrawal amount from the exchange service operation apparatus, and provide the currency to be withdrawn based on the received information.

In some embodiments, the processor may receive exchange rate information from an exchange service operation apparatus, and update exchange rate information stored in a memory to the received exchange rate information.

In some embodiments, the processor may receive an exchange service execution request from a terminal of a user through the communication unit, and control the traveling unit, for movement to a position corresponding to position information based on the position information included in the received exchange service execution request.

In some embodiments, the exchange service robot may be disposed in an overseas transportation management facility, and the processor may receive transportation scheduling information from an overseas transportation management apparatus of the overseas transportation management facility, and control the traveling unit, for movement to any one of a plurality of boarding areas and a plurality of getting-off area in the overseas transportation management facility based on the received transportation schedule information.

In some embodiments, the transportation schedule information may include first transportation schedule information including a departure time, a boarding area and a destination of each of a plurality of transporters or second transportation schedule information including an arrival time, a getting-off area and a departure of each of a plurality of transporters, and the processor may control the traveling unit, for movement to an area corresponding to a boarding area or a getting-off area of a first transporter among the plurality of transporters based on the transportation schedule information.

In some embodiments, the processor may automatically set the currency to be withdrawn to a currency available in a destination of the first transporter based on the first transportation schedule information.

In some embodiments, the processor may automatically set the currency to be withdrawn to a currency available in a country where the overseas transportation management facility is located, based on the second transportation schedule information.

In some embodiments, the processor may control the traveling unit, for movement to an area corresponding to a boarding area of the first transporter having a departure time closest to a current time among the plurality of transporters or a getting-off area of the first transporter having an arrival time closest to the current time among the plurality of transporters.

In some embodiments, the processor may control the traveling unit, for movement to an area corresponding to a boarding area or a getting-off area of the first transporter having a boarding area or a getting-off area closest to a current position of the exchange service robot among the plurality of transporters.

In some embodiments, the processor may recognize the first transporter traveling to a destination where a currency providable by the exchange service robot is available, among the plurality of transporters, and control the traveling unit, for movement to an area corresponding to a boarding area of the first transporter.

An exchange service method using an exchange service robot according to another embodiment of the present invention includes receiving an exchange service execution request, recognizing the amount of currency put through a currency slot of the exchange service robot, acquiring information on a type of a currency to be withdrawn, calculating a withdrawal amount based on exchange rate information between the put currency and the currency to be withdrawn and the recognized amount of put currency, and providing the currency to be withdrawn corresponding to the calculated withdrawal amount.

In some embodiments, the oversea transportation management facility may include at least one of an airport, a railway station, a ferry terminal, or a bus terminal.

DETAILED DESCRIPTION

Figure 1:
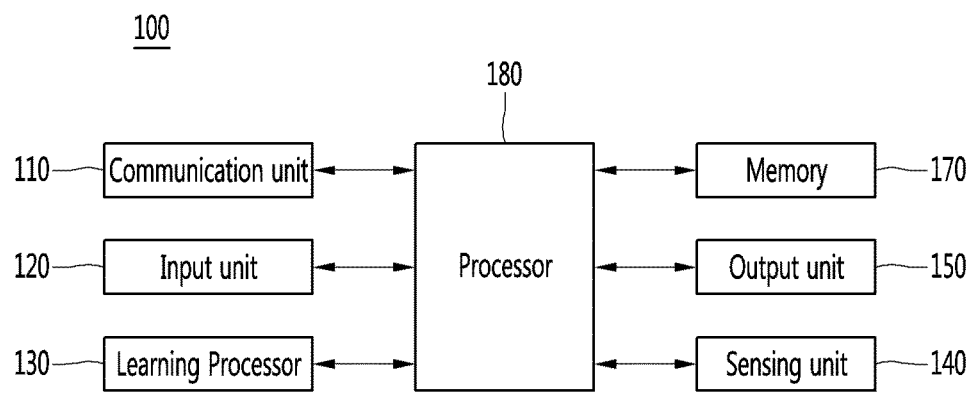
FIG. 1 is a diagram showing an artificial intelligence (AI) device including a robot according to an embodiment of the present invention.

Hereinafter, embodiments disclosed in this specification will be described with reference to the accompanying drawings. The accompanying drawings are used to help easily understand the embodiments disclosed in this specification and it should be understood that the technical ideas disclosed in this specification are not limited by the accompanying drawings and include all alterations, equivalents and substitutes within the spirit and scope of the present invention.

A robot may refer to a machine that automatically processes or operates a given task by its own ability. In particular, a robot having a function of recognizing an environment and performing a self-determination operation may be referred to as an intelligent robot.

Robots may be classified into industrial robots, medical robots, home robots, military robots, and the like according to the use purpose or field.

The robot includes a driving unit may include an actuator or a motor and may perform various physical operations such as moving a robot joint. In addition, a movable robot may include a wheel, a brake, a propeller, and the like in a driving unit, and may travel on the ground through the driving unit or fly in the air.

Artificial intelligence refers to the field of studying artificial intelligence or methodology for making artificial intelligence, and machine learning refers to the field of defining various issues dealt with in the field of artificial intelligence and studying methodology for solving the various issues. Machine learning is defined as an algorithm that enhances the performance of a certain task through a steady experience with the certain task.

An artificial neural network (ANN) is a model used in machine learning and may mean a whole model of problem-solving ability which is composed of artificial neurons (nodes) that form a network by synaptic connections. The artificial neural network can be defined by a connection pattern between neurons in different layers, a learning process for updating model parameters, and an activation function for generating an output value.

The artificial neural network may include an input layer, an output layer, and optionally one or more hidden layers. Each layer includes one or more neurons, and the artificial neural network may include a synapse that links neurons to neurons. In the artificial neural network, each neuron may output the function value of the activation function for input signals, weights, and deflections input through the synapse.

Model parameters refer to parameters determined through learning and include a weight value of synaptic connection and deflection of neurons. A hyperparameter means a parameter to be set in the machine learning algorithm before learning, and includes a learning rate, a repetition number, a mini batch size, and an initialization function.

The purpose of the learning of the artificial neural network may be to determine the model parameters that minimize a loss function. The loss function may be used as an index to determine optimal model parameters in the learning process of the artificial neural network.

Machine learning may be classified into supervised learning, unsupervised learning, and reinforcement learning according to a learning method.

The supervised learning may refer to a method of learning an artificial neural network in a state in which a label for learning data is given, and the label may mean the correct answer (or result value) that the artificial neural network must infer when the learning data is input to the artificial neural network. The unsupervised learning may refer to a method of learning an artificial neural network in a state in which a label for learning data is not given. The reinforcement learning may refer to a learning method in which an agent defined in a certain environment learns to select a behavior or a behavior sequence that maximizes cumulative compensation in each state.

Machine learning, which is implemented as a deep neural network (DNN) including a plurality of hidden layers among artificial neural networks, is also referred to as deep learning, and the deep learning is part of machine learning. In the following, machine learning is used to mean deep learning.

Self-driving refers to a technique of driving for oneself, and a self-driving vehicle refers to a vehicle that travels without an operation of a user or with a minimum operation of a user.

For example, the self-driving may include a technology for maintaining a lane while driving, a technology for automatically adjusting a speed, such as adaptive cruise control, a technique for automatically traveling along a predetermined route, and a technology for automatically setting and traveling a route when a destination is set.

The vehicle may include a vehicle having only an internal combustion engine, a hybrid vehicle having an internal combustion engine and an electric motor together, and an electric vehicle having only an electric motor, and may include not only an automobile but also a train, a motorcycle, and the like.

At this time, the self-driving vehicle may be regarded as a robot having a self-driving function.

FIG. 1 illustrates an AI device 100 including a robot according to an embodiment of the present invention.

The AI device 100 may be implemented by a stationary device or a mobile device, such as a TV, a projector, a mobile phone, a smartphone, a desktop computer, a notebook, a digital broadcasting terminal, a personal digital assistant (PDA), a portable multimedia player (PMP), a navigation device, a tablet PC, a wearable device, a set-top box (STB), a DMB receiver, a radio, a washing machine, a refrigerator, a desktop computer, a digital signage, a robot, a vehicle, and the like.

Referring to FIG. 1, the AI device 100 may include a communication unit 110, an input unit 120, a learning processor 130, a sensing unit 140, an output unit 150, a memory 170, and a processor 180.

The communication unit 110 may transmit and receive data to and from external devices such as other AI devices 100a to 100e and the AI server 200 by using wire/wireless communication technology. For example, the communication unit 110 may transmit and receive sensor information, a user input, a learning model, and a control signal to and from external devices.

The communication technology used by the communication unit 110 includes GSM (Global System for Mobile communication), CDMA (Code Division Multi Access), LTE (Long Term Evolution), 5G, WLAN (Wireless LAN), Wi-Fi (Wireless-Fidelity), Bluetooth™ RFID (Radio Frequency Identification), Infrared Data Association (IrDA), ZigBee, NFC (Near Field Communication), and the like.

The input unit 120 may acquire various kinds of data.

At this time, the input unit 120 may include a camera for inputting a video signal, a microphone for receiving an audio signal, and a user input unit for receiving information from a user. The camera or the microphone may be treated as a sensor, and the signal acquired from the camera or the microphone may be referred to as sensing data or sensor information.

The input unit 120 may acquire a learning data for model learning and an input data to be used when an output is acquired by using learning model. The input unit 120 may acquire raw input data. In this case, the processor 180 or the learning processor 130 may extract an input feature by preprocessing the input data.

The learning processor 130 may learn a model composed of an artificial neural network by using learning data. The learned artificial neural network may be referred to as a learning model. The learning model may be used to an infer result value for new input data rather than learning data, and the inferred value may be used as a basis for determination to perform a certain operation.

At this time, the learning processor 130 may perform AI processing together with the learning processor 240 of the AI server 200.

At this time, the learning processor 130 may include a memory integrated or implemented in the AI device 100. Alternatively, the learning processor 130 may be implemented by using the memory 170, an external memory directly connected to the AI device 100, or a memory held in an external device.

The sensing unit 140 may acquire at least one of internal information about the AI device 100, ambient environment information about the AI device 100, or user information by using various sensors.

Examples of the sensors included in the sensing unit 140 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a lidar, and a radar.

The output unit 150 may generate an output related to a visual sense, an auditory sense, or a haptic sense.

At this time, the output unit 150 may include a display unit for outputting time information, a speaker for outputting auditory information, and a haptic module for outputting haptic information.

The memory 170 may store data that supports various functions of the AI device 100. For example, the memory 170 may store input data acquired by the input unit 120, learning data, a learning model, a learning history, and the like.

The processor 180 may determine at least one executable operation of the AI device 100 based on information determined or generated by using a data analysis algorithm or a machine learning algorithm. The processor 180 may control the components of the AI device 100 to execute the determined operation.

To this end, the processor 180 may request, search, receive, or utilize data of the learning processor 130 or the memory 170. The processor 180 may control the components of the AI device 100 to execute the predicted operation or the operation determined to be desirable among the at least one executable operation.

When the connection of an external device is required to perform the determined operation, the processor 180 may generate a control signal for controlling the external device and may transmit the generated control signal to the external device.

The processor 180 may acquire intention information for the user input and may determine the user's requirements based on the acquired intention information.

The processor 180 may acquire the intention information corresponding to the user input by using at least one of a speech to text (STT) engine for converting speech input into a text string or a natural language processing (NLP) engine for acquiring intention information of a natural language.

At least one of the STT engine or the NLP engine may be configured as an artificial neural network, at least part of which is learned according to the machine learning algorithm. At least one of the STT engine or the NLP engine may be learned by the learning processor 130, may be learned by the learning processor 240 of the AI server 200, or may be learned by their distributed processing.

The processor 180 may collect history information including the operation contents of the AI apparatus 100 or the user's feedback on the operation and may store the collected history information in the memory 170 or the learning processor 130 or transmit the collected history information to the external device such as the AI server 200. The collected history information may be used to update the learning model.

The processor 180 may control at least part of the components of AI device 100 so as to drive an application program stored in memory 170. Furthermore, the processor 180 may operate two or more of the components included in the AI device 100 in combination so as to drive the application program.

Figure 2:
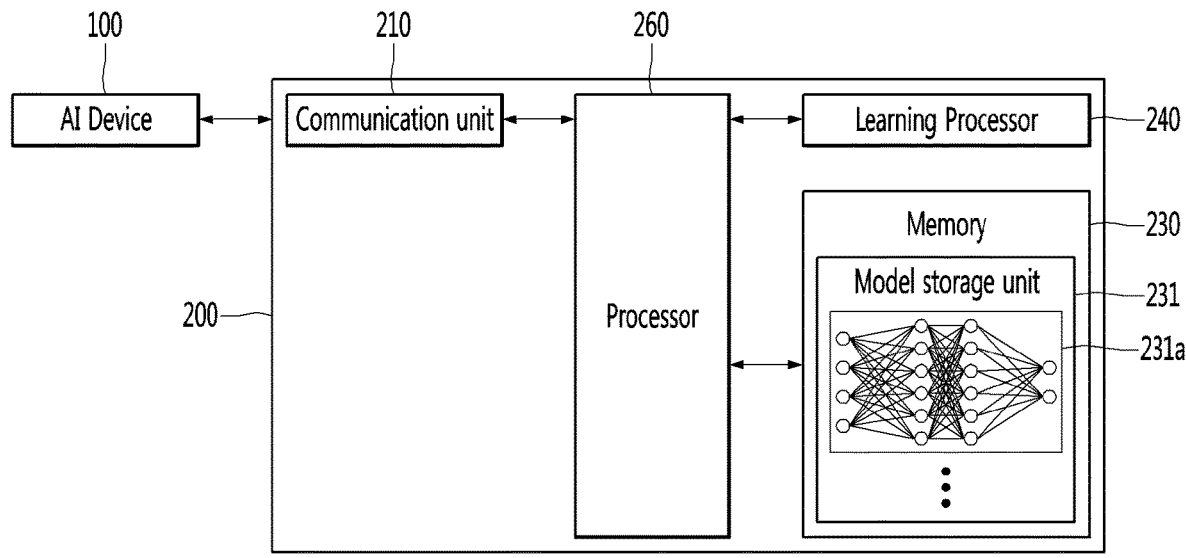
FIG. 2 is a diagram showing an AI server connected to a robot according to an embodiment of the present invention.

FIG. 2 illustrates an AI server 200 connected to a robot according to an embodiment of the present invention.

Referring to FIG. 2, the AI server 200 may refer to a device that learns an artificial neural network by using a machine learning algorithm or uses a learned artificial neural network. The AI server 200 may include a plurality of servers to perform distributed processing, or may be defined as a 5G network. At this time, the AI server 200 may be included as a partial configuration of the AI device 100, and may perform at least part of the AI processing together.

The AI server 200 may include a communication unit 210, a memory 230, a learning processor 240, a processor 260, and the like.

The communication unit 210 can transmit and receive data to and from an external device such as the AI device 100.

The memory 230 may include a model storage unit 231. The model storage unit 231 may store a learning or learned model (or an artificial neural network 231a) through the learning processor 240.

The learning processor 240 may learn the artificial neural network 231a by using the learning data. The learning model may be used in a state of being mounted on the AI server 200 of the artificial neural network, or may be used in a state of being mounted on an external device such as the AI device 100.

The learning model may be implemented in hardware, software, or a combination of hardware and software. If all or part of the learning models are implemented in software, one or more instructions that constitute the learning model may be stored in memory 230.

The processor 260 may infer the result value for new input data by using the learning model and may generate a response or a control command based on the inferred result value.

Figure 3:
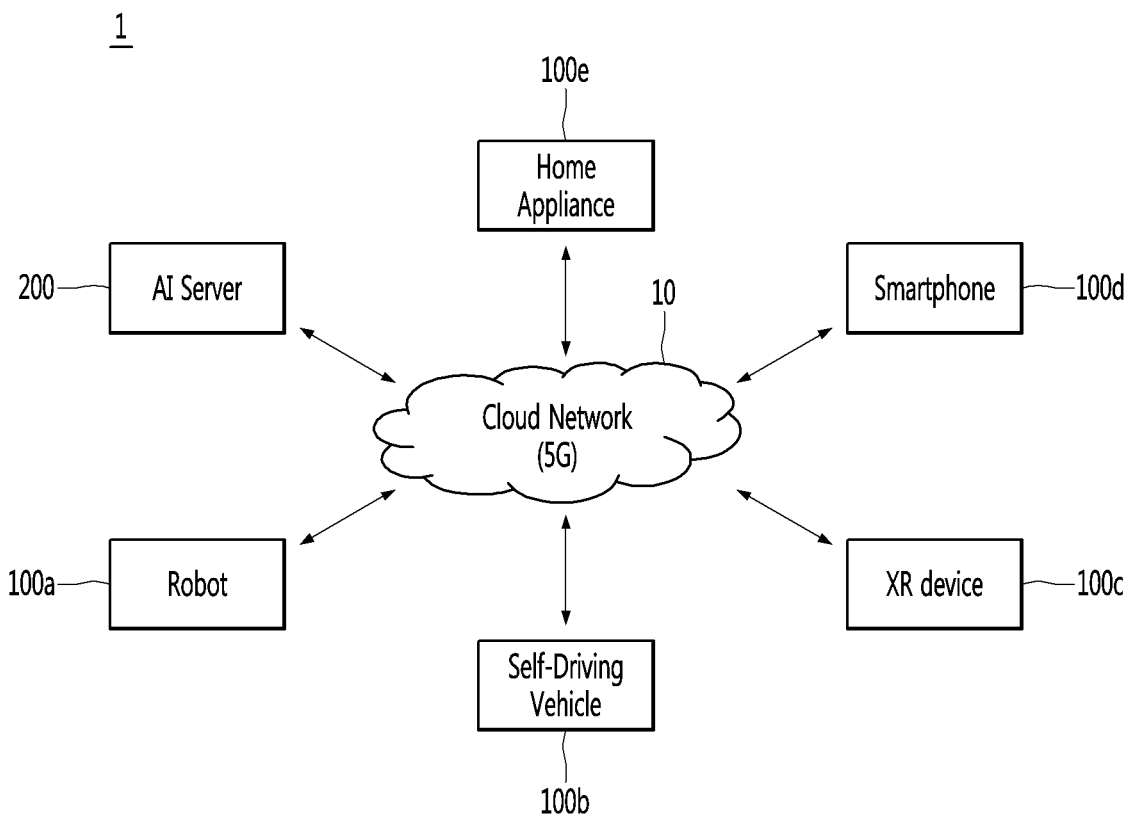
FIG. 3 is a diagram showing an AI system including a robot according to an embodiment of the present invention.

FIG. 3 illustrates an AI system 1 according to an embodiment of the present invention.

Referring to FIG. 3, in the AI system 1, at least one of an AI server 200, a robot 100a, a self-driving vehicle 100b, an XR device 100c, a smartphone 100d, or a home appliance 100e is connected to a cloud network 10. The robot 100a, the self-driving vehicle 100b, the XR device 100c, the smartphone 100d, or the home appliance 100e, to which the AI technology is applied, may be referred to as AI devices 100a to 100e.

The cloud network 10 may refer to a network that forms part of a cloud computing infrastructure or exists in a cloud computing infrastructure. The cloud network 10 may be configured by using a 3G network, a 4G or LTE network, or a 5G network.

That is, the devices 100a to 100e and 200 configuring the AI system 1 may be connected to each other through the cloud network 10. In particular, each of the devices 100a to 100e and 200 may communicate with each other through a base station, but may directly communicate with each other without using a base station.

The AI server 200 may include a server that performs AI processing and a server that performs operations on big data.

The AI server 200 may be connected to at least one of the AI devices constituting the AI system 1, that is, the robot 100a, the self-driving vehicle 100b, the XR device 100c, the smartphone 100d, or the home appliance 100e through the cloud network 10, and may assist at least part of AI processing of the connected AI devices 100a to 100e.

At this time, the AI server 200 may learn the artificial neural network according to the machine learning algorithm instead of the AI devices 100a to 100e, and may directly store the learning model or transmit the learning model to the AI devices 100a to 100e.

At this time, the AI server 200 may receive input data from the AI devices 100a to 100e, may infer the result value for the received input data by using the learning model, may generate a response or a control command based on the inferred result value, and may transmit the response or the control command to the AI devices 100a to 100e.

Alternatively, the AI devices 100a to 100e may infer the result value for the input data by directly using the learning model, and may generate the response or the control command based on the inference result.

Hereinafter, various embodiments of the AI devices 100a to 100e to which the above-described technology is applied will be described. The AI devices 100a to 100e illustrated in FIG. 3 may be regarded as a specific embodiment of the AI device 100 illustrated in FIG. 1.

The robot 100a, to which the AI technology is applied, may be implemented as a guide robot, a carrying robot, a cleaning robot, a wearable robot, an entertainment robot, a pet robot, an unmanned flying robot, or the like.

The robot 100a may include a robot control module for controlling the operation, and the robot control module may refer to a software module or a chip implementing the software module by hardware.

The robot 100a may acquire state information about the robot 100a by using sensor information acquired from various kinds of sensors, may detect (recognize) surrounding environment and objects, may generate map data, may determine the route and the travel plan, may determine the response to user interaction, or may determine the operation.

The robot 100a may use the sensor information acquired from at least one sensor among the lidar, the radar, or the camera so as to determine the travel route and the travel plan.

The robot 100a may perform the above-described operations by using the learning model composed of at least one artificial neural network. For example, the robot 100a may recognize the surrounding environment and the objects by using the learning model, and may determine the operation by using the recognized surrounding information or object information. The learning model may be learned directly from the robot 100a or may be learned from an external device such as the AI server 200.

At this time, the robot 100a may perform the operation by generating the result by directly using the learning model, but the sensor information may be transmitted to the external device such as the AI server 200 and the generated result may be received to perform the operation.

The robot 100a may use at least one of the map data, the object information detected from the sensor information, or the object information acquired from the external apparatus to determine the travel route and the travel plan, and may control the driving unit such that the robot 100a travels along the determined travel route and travel plan.

The map data may include object identification information about various objects arranged in the space in which the robot 100a moves. For example, the map data may include object identification information about fixed objects such as walls and doors and movable objects such as pollen and desks. The object identification information may include a name, a type, a distance, and a position.

In addition, the robot 100a may perform the operation or travel by controlling the driving unit based on the control/interaction of the user. At this time, the robot 100a may acquire the intention information of the interaction due to the user's operation or speech utterance, and may determine the response based on the acquired intention information, and may perform the operation.

The robot 100a, to which the AI technology and the self-driving technology are applied, may be implemented as a guide robot, a carrying robot, a cleaning robot, a wearable robot, an entertainment robot, a pet robot, an unmanned flying robot, or the like.

The robot 100a, to which the AI technology and the self-driving technology are applied, may refer to the robot itself having the self-driving function or the robot 100a interacting with the self-driving vehicle 100b.

The robot 100a having the self-driving function may collectively refer to a device that moves for itself along the given movement line without the user's control or moves for itself by determining the movement line by itself.

The robot 100a and the self-driving vehicle 100b having the self-driving function may use a common sensing method so as to determine at least one of the travel route or the travel plan. For example, the robot 100a and the self-driving vehicle 100b having the self-driving function may determine at least one of the travel route or the travel plan by using the information sensed through the lidar, the radar, and the camera.

The robot 100a that interacts with the self-driving vehicle 100b exists separately from the self-driving vehicle 100b and may perform operations interworking with the self-driving function of the self-driving vehicle 100b or interworking with the user who rides on the self-driving vehicle 100b.

At this time, the robot 100a interacting with the self-driving vehicle 100b may control or assist the self-driving function of the self-driving vehicle 100b by acquiring sensor information on behalf of the self-driving vehicle 100b and providing the sensor information to the self-driving vehicle 100b, or by acquiring sensor information, generating environment information or object information, and providing the information to the self-driving vehicle 100b.

Alternatively, the robot 100a interacting with the self-driving vehicle 100b may monitor the user boarding the self-driving vehicle 100b, or may control the function of the self-driving vehicle 100b through the interaction with the user. For example, when it is determined that the driver is in a drowsy state, the robot 100a may activate the self-driving function of the self-driving vehicle 100b or assist the control of the driving unit of the self-driving vehicle 100b. The function of the self-driving vehicle 100b controlled by the robot 100a may include not only the self-driving function but also the function provided by the navigation system or the audio system provided in the self-driving vehicle 100b.

Alternatively, the robot 100a that interacts with the self-driving vehicle 100b may provide information or assist the function to the self-driving vehicle 100b outside the self-driving vehicle 100b. For example, the robot 100a may provide traffic information including signal information and the like, such as a smart signal, to the self-driving vehicle 100b, and automatically connect an electric charger to a charging port by interacting with the self-driving vehicle 100b like an automatic electric charger of an electric vehicle.

Figure 4:
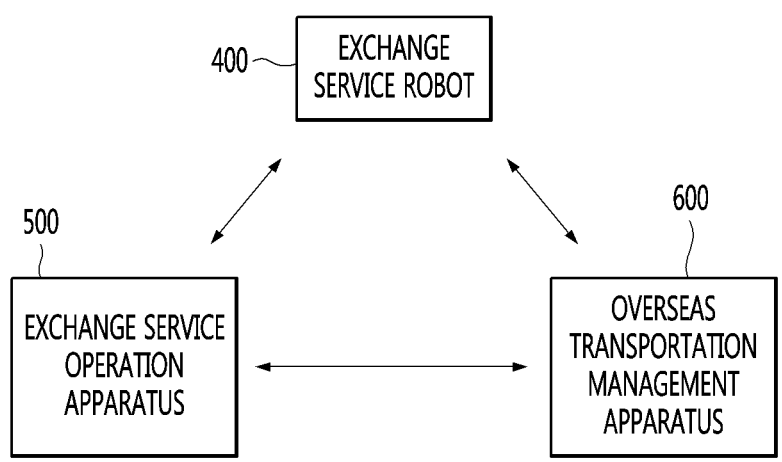
FIG. 4 is a diagram illustrating the concept of an exchange service robot according to an embodiment of the present invention and an exchange service system including the same.

FIG. 4 is a diagram illustrating the concept of an exchange service robot according to an embodiment of the present invention and an exchange service system including the same.

Referring to FIG. 4, the exchange service system may include an exchange service robot 400, an exchange service operation apparatus 500 and an overseas transportation management apparatus 600. The components included in the exchange service system are not limited to FIG. 4 and the exchange service system may include more or fewer components than FIG. 4.

The exchange service robot 400 may be disposed in an overseas transportation management facility managed by the manager of the overseas transportation management facility to provide various services such as an exchange service, a guidance service, etc. to users of the overseas transportation management facility.

The overseas transportation management facility may mean a place where transporter is used and managed, such as an airport, a railway station, a ferry terminal, a bus terminal, etc. In particular, the overseas transportation management facility means a facility for managing a transporter moving a certain country to another country and may include an international terminal of an airport, an international terminal of a railway station, an international ferry terminal, an international bus terminal, etc.

The exchange service operation apparatus 500 may correspond to an operator of an exchange service provided through the exchange service robot 400. The exchange service operation apparatus 500 may perform management operation such as distribution or update of an exchange service application installed in the exchange service robot 400. That is, the exchange service robot 400 may execute the exchange service application received from the exchange service operation apparatus 500, thereby providing the exchange service to a user.

For example, the exchange service operation apparatus 500 may correspond to a server of a financial institution (e.g., a bank). Alternatively, the exchange service operation apparatus 500 may be a server operated by the manager of various currencies such as an electronic currency, a virtual currency and a cryptocurrency. Alternatively, the exchange service operation apparatus 500 may be a server for managing rewards available in a specific website or an e-commerce service, such as mileage or points. That is, the exchange service system according to the embodiment of the present invention may provide not only a service for exchanging the currency of a certain country for the currency of another country but also a service for exchanging the currency of the certain country for various types of currencies such as an electronic currency, a virtual currency, a cryptocurrency, mileage, points, etc.

The overseas transportation management apparatus 600 may correspond to a server for performing overall management operation of the overseas transportation management facility. The overseas transportation management apparatus 600 may manage and control operation of a plurality of electronic apparatuses provided inside/outside the overseas transportation management facility. In addition, the overseas transportation management apparatus 600 may manage a plurality of access points (e.g., a router, a Wi-Fi router, etc.) provided in the overseas transportation management facility. The exchange service robot 400 may be connected to a network through the access points and connected to the exchange service operation apparatus 500 over the network.

In some embodiments, the overseas transportation management apparatus 600 may transmit transportation scheduling information to the exchange service robot 400 periodically or in real time. The exchange service robot 400 may provide a more efficient exchange service based on the received transportation schedule information. An embodiment related thereto will be described below with reference to FIG. 10.

Hereinafter, the configuration of the exchange service robot 400 according to the embodiment of the present invention and embodiments of various exchange services provided through the exchange service robot 400 will be described with reference to FIGS. 5 to 11.

Figure 5:
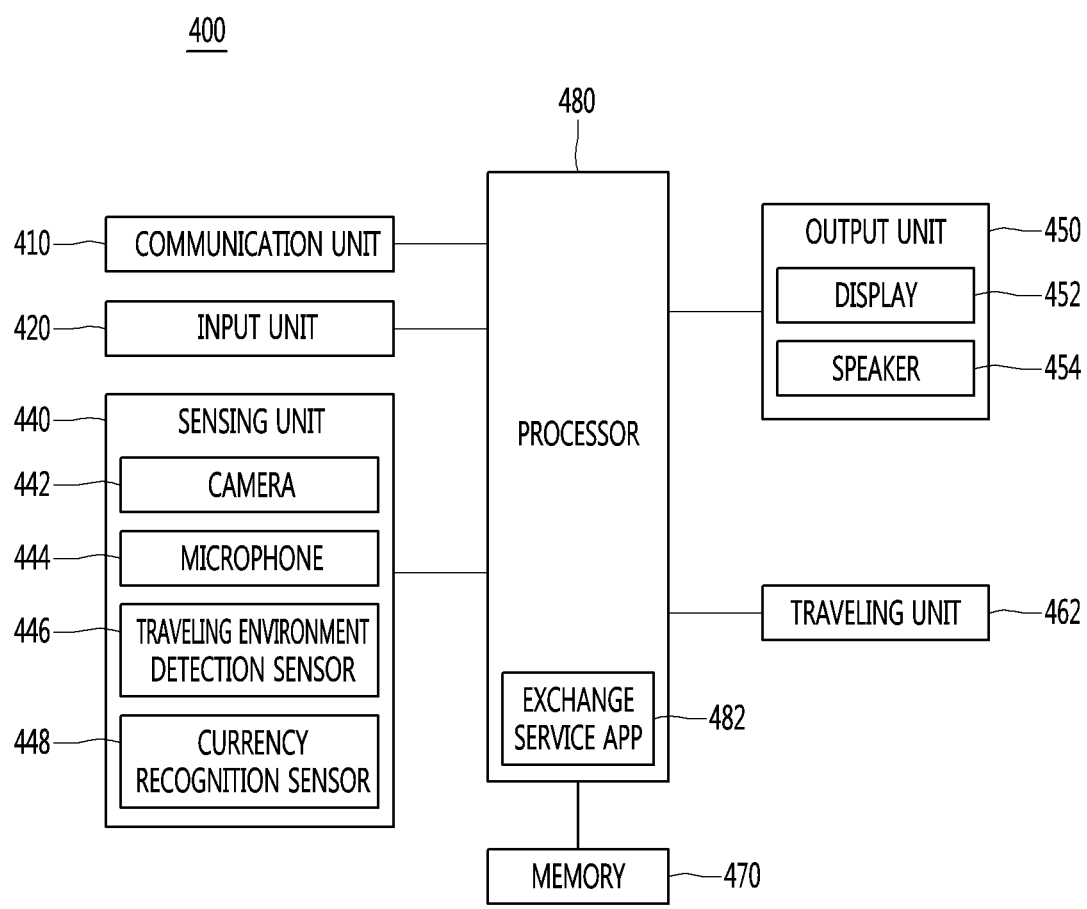
FIG. 5 is a block diagram showing the control configuration of an exchange service robot according to an embodiment of the present invention.

FIG. 5 is a block diagram showing the control configuration of an exchange service robot according to an embodiment of the present invention.

Referring to FIG. 5, the exchange service robot 400 according to the embodiment of the present invention may include a communication unit 410, an input unit 420, a sensing unit 440, an output unit 450, a traveling unit 462, a memory 470 and a processor 480. The components shown in FIG. 5 are an example for convenience of description and the exchange service robot 400 may include more or fewer components than FIG. 5.

Meanwhile, the exchange service robot 400 may be implemented as the AI device 100 described with reference to FIG. 1. That is, the description of the components described above with reference to FIG. 1 is equally applicable to the components of the exchange service robot 400 corresponding thereto.

The communication unit 410 may include communication modules for connecting the exchange service robot 400 with the exchange service operation apparatus 500, the overseas transportation management apparatus 600, etc. The communication modules may support any one of the communication technologies described above with reference to FIG. 1.

For example, the exchange service robot 400 may be connected to the network through the access point such as the router in the overseas transportation management facility. Therefore, the exchange service robot 400 may transmit a variety of information and/or data acquired through the input unit 420 or the sensing unit 440 or processed by the processor 480 to the exchange service operation apparatus 500, the overseas transportation management apparatus 600, the other server, etc. over the network.

The input unit 420 may include at least input portion for acquiring various types of data. For example, the at least one input portion may include a physical input portion such as a button or a dial and a touch input portion such as a touch pad or a touch panel. A user may input various requests or commands to the exchange service robot 400 through the input unit 420.

The sensing unit 440 may include at least one sensor for sensing a variety of information around the exchange service robot 400. For example, the sensing unit 440 may include a camera 442, a microphone 444, a traveling environment detection sensor 446 and a currency recognition sensor 448.

The camera 442 may acquire an image around the exchange service robot 400.

For example, the exchange service robot 400 may include at least one camera 442, and the at least one camera 442 may be implemented as a stereo camera, a 2D camera, an infrared camera, etc.

The microphone 444 may detect sound (human voice, sound generated by a specific object, etc.) around the exchange service robot 400.

In some embodiments, the camera 442 and the microphone 444 may function as the input unit 420. For example, the processor 480 may receive the voice of the user corresponding to an exchange service execution request through the microphone 444 and execute an exchange service application (APP) 482 based on the received voice.

The traveling environment detection sensor 446 may include at least one sensor for detecting an obstacle around the exchange service robot 400, an obstacle located on a floor, a step of a floor, etc., for stable traveling of the exchange service robot 400. For example, the traveling environment detection sensor 446 may include a camera, an ultrasonic sensor, a proximity sensor, etc.

The processor 480 may control the traveling direction or traveling speed of the exchange service robot 400 based on the sensing value of the traveling environment detection sensor 446. For example, the processor 480 may detect an obstacle located ahead based on the sensing value, set or change a traveling route based on the detected obstacle, and control the traveling unit 462 (e.g., a traveling motor) based on the set or changed traveling route.

When the user puts a currency to be exchanged into the exchange service robot 400 through a currency slot 402 (see FIG. 7) while the exchange service is provided, the currency recognition sensor 448 may recognize the type or amount of the put currency. For example, the currency recognition sensor 448 may include at least one sensor related to currency recognition, such as a camera, a weight sensor, an optical sensor, etc. The exchange service robot 400 may recognize the type and amount of the put currency using the currency recognition sensor 448 and a known currency recognition scheme. For example, a sorting device for the sorting currencies put through the currency slot 402 according to the sizes or weights of the currencies may be provided in the exchange service robot 400. When the currencies are sorted by the sorting device, the currency recognition sensor 448 may detect the number of sorted currencies and recognize the amount of put currencies based on the result of detection.

The output unit 450 may output operation or states of the exchange service robot 400 or a variety of information related to various services, programs, applications, etc. executed on the exchange service robot 400.

For example, the output unit 450 may include a display 452 and a speaker 454.

The display 452 may output the variety of information or messages in the form of graphics. In some embodiments, the display 452 may be implemented in the form of a touchscreen along with a touch input unit. In this case, the display 452 may function as an output unit and an input unit. The speaker 454 may output the variety of information or messages in the form of voice or sound.

The traveling unit 462 is used for movement (traveling) of the exchange service robot 400 and may include, for example, a traveling motor. The traveling motor may be connected to at least one wheel provided at the lower portion of the exchange service robot 400 to provide driving force of the exchange service robot 400 to the wheel. For example, the traveling unit 462 may include at least one traveling motor and the processor 480 may control the at least one traveling motor to adjust the traveling direction and/or the traveling speed.

The memory 470 may store a variety of data such as control data for controlling operation of the components included in the exchange service robot 400, data for performing operation based on input acquired through the input unit 420, information acquired through the sensing unit 440, etc.

In addition, the memory 470 may store program data of a software module or an application executed by at least one processing unit or controller included in the processor 480.

In addition, the memory 470 according to the embodiment of the present invention may store program data of the exchange service APP 482 for providing the exchange service. When an exchange service execution request is received, the processor 480 may load the program data of the exchange service APP 482 stored in the memory 470, thereby executing the exchange service APP 482.

In addition, the memory 470 may store an algorithm for adjusting a traveling speed or a traveling direction based on the sensing value acquired through the traveling environment detection sensor 446.

In addition, the memory 470 may store an algorithm for recognizing the type and amount of currency put through the currency slot 402 based on the sensing value of the currency recognition sensor 448.

The memory 470 may include various storage devices such as a ROM, a RAM, an EEPROM, a flash drive, a hard drive, etc. in hardware.

The processor 480 may include at least one processing unit or controller for controlling operation of the exchange service robot 400. Specifically, the processor 480 may include at least one CPU, AP (application processor), microcomputer, integrated circuit, ASIC (application specific integrated circuit), etc.

The processor 480 may control overall operation of the components included in the exchange service robot 400. In addition, the processor 480 may include an image signal processor (ISP) for processing the image signal acquired through the camera 442 and generating image data, a display controller for controlling operation of the display 452, etc.

When the exchange service execution request is received from the user, the processor 480 may load the program data of the exchange service APP 482 stored in the memory 470, thereby executing the exchange service APP 482. The processor 480 may provide the exchange service to the user through the executed exchange service APP 482.

Figure 6:
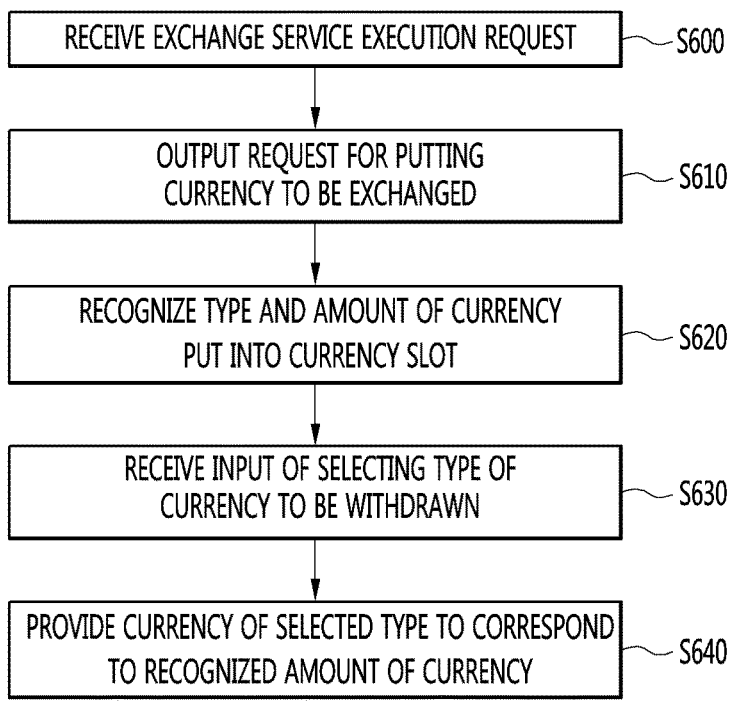
FIG. 6 is a flowchart illustrating a method of providing an exchange service of an exchange service robot according to an embodiment of the present invention.
Figure 7:
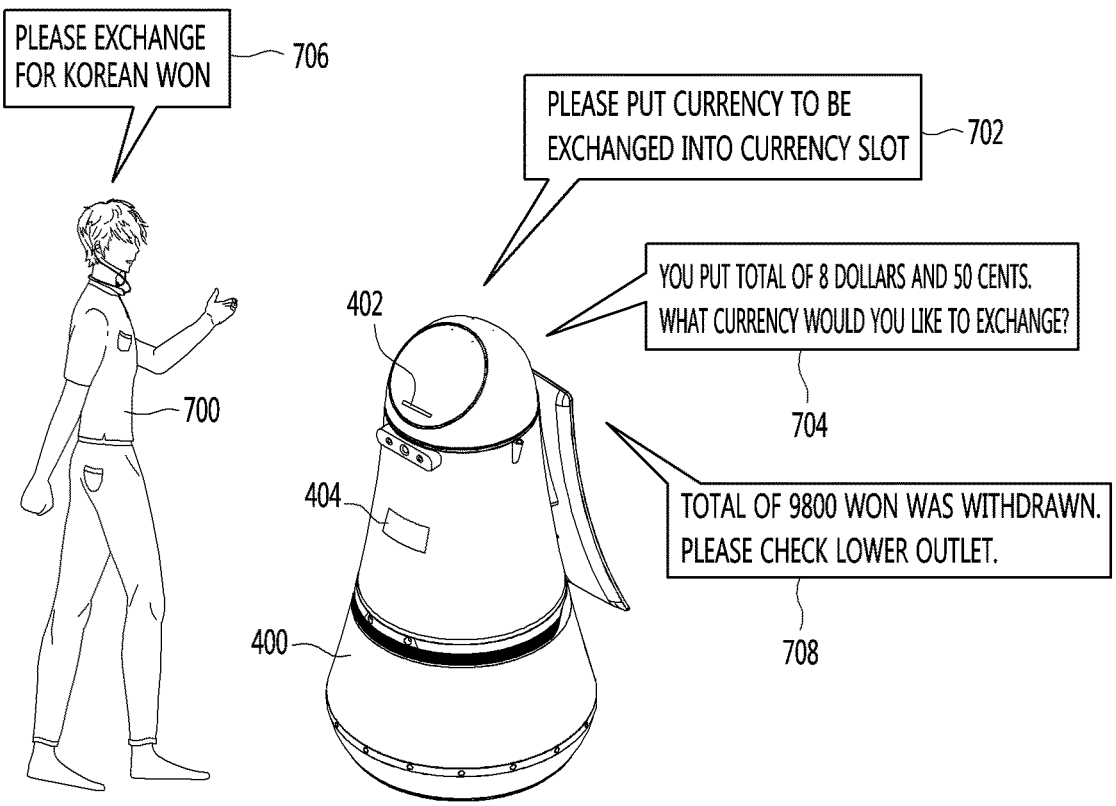
FIG. 7 is a view showing an example related to the method of providing the exchange service of the exchange service robot shown in FIG. 6.

FIG. 6 is a flowchart illustrating a method of providing an exchange service of an exchange service robot according to an embodiment of the present invention. FIG. 7 is a view showing an example related to the method of providing the exchange service of the exchange service robot shown in FIG. 6.

Referring to FIGS. 6 to 7, the exchange service robot 400 may receive the exchange service execution request from the user (S600).

The exchange service robot 400 may receive the exchange service execution request from the user, in a state of traveling inside/outside the overseas transportation management facility or being stopped at a predetermined position.

For example, the user may operate the input unit 420 of the exchange service robot 400 or utter voice, thereby inputting the exchange service execution request.

As the exchange service execution request is received, the processor 480 may execute the exchange service APP 482.

In some embodiments, the exchange service robot 400 may receive the exchange service execution request from the terminal of the user through the communication unit 410. The exchange service execution request may include the position information of the user (terminal) and the processor 480 may move to the position of the user (terminal) to provide the exchange service based on the received exchange service execution request.

The exchange service robot 400 may output a request for putting a currency to be exchanged (S610).

The processor 480 may output a request for prompting the user to put the currency to be exchanged into the currency slot 402 through the output unit 450. For example, the processor 480 may output a voice message 702 including the request for putting the currency through the speaker 454.

The exchange service robot 400 may recognize the type and amount of currency put into the currency slot 402 (S620).

The user may put the currency to be exchanged into the currency slot 402 according to the request for putting the currency.

When the currency is put into the currency slot 402, the processor 480 may recognize the type and amount of the put currency using the currency recognition sensor 448.

In some embodiments, the processor 480 may request the user to put only a predetermined type of currency (e.g., a currency of a country where the user is currently located). In this case, the processor 480 may recognize only the amount of put currency.

Alternatively, the processor 480 may acquire information on the amount of currency through the input unit 420 before the currency is put. In this case, the processor 480 may compare the acquired information on the amount of put currency with the amount of currency recognized using the currency recognition sensor 448, thereby more accurately recognizing the amount of currency put into the currency slot 402.

The exchange service robot 400 may receive input of selecting the type of the currency to be withdrawn (S630).

The type of the currency to be provided by the exchange service robot 400 may be limited. Based on this, the processor 480 may output a list including types of currencies providable by the exchange service robot 400 through the display 452, and output a request for selecting any one of the types of currencies included in the output list.

For example, the types of currencies providable by the exchange service robot 400 may include real currencies received in the exchange service robot 400, an electronic currency, a virtual currency, a cryptocurrency, mileage or points of managers affiliated or associated with the exchange service, etc.

For example, as shown in FIG. 7, the processor 480 may output the information on the amount of currency recognized in step S620 and a message 704 including the request for selection through the speaker 454.

The user may select the type of currency to be withdrawn through the input unit 420 based on the output message 704.

For example, the user may utter voice 706 including the information on the type of the currency to be withdrawn. The processor 480 may receive the voice 706 through the microphone 444 and acquire information on the type of the currency from the received voice 706.

Although step S630 is shown as being performed after step S620 in FIG. 6, step S630 may be performed at an arbitrary point in time between step S600 and step S640.

In some embodiments, when the type of the currency providable by the exchange service robot 400 is limited to one, step S630 may not be performed.

The exchange service robot 400 may provide the currency of the selected type to correspond to the recognized amount of currency (S640).

The processor 480 may calculate a withdrawal amount corresponding to the recognized amount of currency with respect to the selected currency based on information on an exchange rate (hereinafter referred to as exchange rate information) between the put currency and the selected currency.

For example, when the selected currency is a real currency, the processor 480 may perform control such that the currency corresponding to the withdraw amount is withdrawn through a currency outlet 404. The processor 480 may output a message 708 including the withdraw amount and an withdrawal notification through the output unit 450.

In some embodiments, when the selected currency is not a real currency, that is, when the selected currency is an electronic currency, a virtual currency, a cryptocurrency, mileage or points, the processor 480 may transmit information on the withdrawal amount to the exchange service operation apparatus 500 to transfer the currency corresponding to the withdrawal amount to the account of the user. The exchange service operation apparatus 500 may transfer the currency corresponding to the withdrawal amount to the account of the user based on the received information.

Meanwhile, some of operations related to the exchange service according to the embodiment of the present invention may be performed by the exchange service operation apparatus 500 connected to the exchange service robot 400. Embodiments related thereto will be described with reference to FIGS. 8 to 9.

Figure 8:
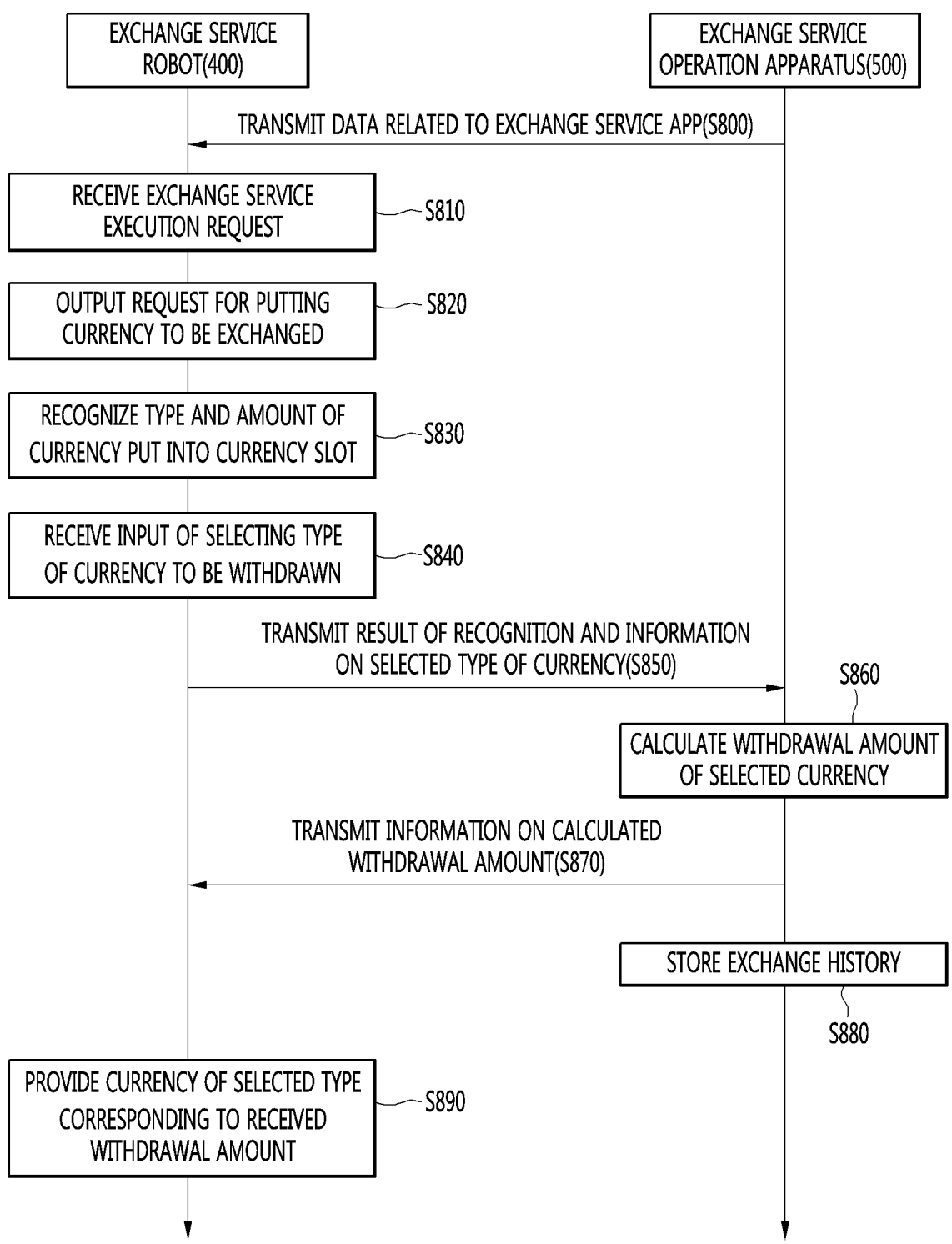
FIG. 8 is a ladder diagram illustrating an embodiment of an exchange service provision method using an exchange service robot and an exchange service operation apparatus.

FIG. 8 is a ladder diagram illustrating an embodiment of an exchange service provision method using an exchange service robot and an exchange service operation apparatus.

Referring to FIG. 8, the exchange service operation apparatus 500 may transmit data related to the exchange service APP 482 installed in the exchange service robot 400 periodically or whenever necessary (S800). For example, the data may be data for update of the exchange service APP 482.

The exchange service robot 400 may receive the exchange service execution request from the user (S810). As the exchange service is executed, the exchange service robot 400 may output a request for putting the currency to be exchanged (S820). The exchange service robot 400 may recognize the type and amount of currency put into currency slot 402 (S830). The exchange service robot 400 may receive input of selecting the type of a currency to be withdrawn (S840).

Steps S810 to S840 are substantially equal to steps S600 to S630 of FIG. 6 and a description thereof will be omitted.

The exchange service robot 400 may transmit the result of recognition of step S830 and information on the type of the currency selected in step S840 to the exchange service operation apparatus 500 (S850).

The processor 480 may control the communication unit 410 to transmit the information on the type and amount of currency recognized in step S830 and the information on the type of the currency selected in step S840 to the exchange service operation apparatus 500.

In some embodiments, if the number of types of the currencies puttable into the currency slot 402 is limited to one, the processor 480 may transmit the information on the recognized amount of currency and the information on the selected currency to the exchange service operation apparatus 500.

The exchange service operation apparatus 500 may calculate the withdrawal amount of the selected currency based on the received result of recognition and the information on the type of the selected currency (S860).

The exchange service operation apparatus 500 may calculate the withdrawal amount based on the exchange rate information between the recognized currency and the selected currency.

The exchange service operation apparatus 500 may transmit the information on the calculated withdrawal amount to the exchange service robot 400 (S870), and an exchange history in a memory or a database (S880). The exchange service robot 400 may provide the currency of the selected type corresponding to the received withdrawal amount (S890).

The processor 480 may perform control to provide the currency corresponding to the withdrawal amount through the currency outlet 404 based on the information on the received withdrawal amount from the exchange service operation apparatus 500.

In some embodiments, when the currency of the selected type is not a real currency, the exchange service operation apparatus 500 may transfer the currency to be withdrawn to the account of the user based on the calculated withdrawal amount and transmit the exchange history (or the exchange processing result) to the exchange service robot 400. The exchange service robot 400 may output a screen or voice corresponding to the received exchange history through the output unit 450.

Figure 9:
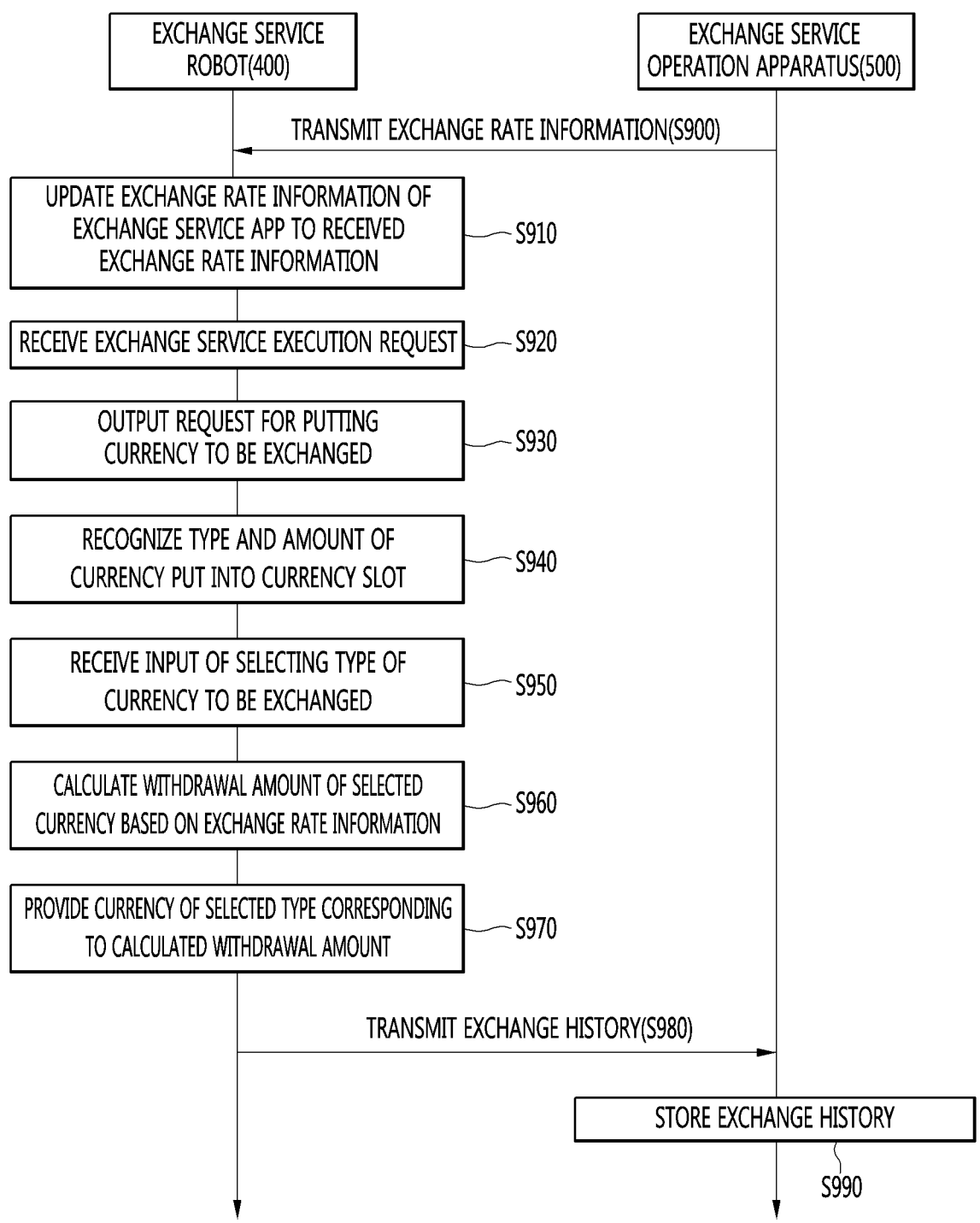
FIG. 9 is a ladder diagram illustrating an embodiment of an exchange service provision method using an exchange service robot and an exchange service operation apparatus.

FIG. 9 is a ladder diagram illustrating an embodiment of an exchange service provision method using an exchange service robot and an exchange service operation apparatus.

Referring to FIG. 9, the exchange service operation apparatus 500 may transmit exchange rate information to the exchange service robot 400 periodically or whenever the exchange rate is changed (S900). The exchange service robot 400 may update the exchange rate information used in the exchange service APP 482 to the received exchange rate information (S910).

Steps S920 to S970 are substantially equal to steps S600 to S640 of FIG. 6 and a description thereof will be omitted.

The exchange service robot 400 may transmit the exchange history to the exchange service operation apparatus 500 after the exchange service is finished (S980), and the exchange service operation apparatus 500 may store the received exchange history in a memory or a database (S990).

For example, the exchange history may include information on the type and amount of currency recognized in step S940 and information on the withdrawal amount of the selected currency calculated in step S960.

That is, according to the embodiment shown in FIGS. 6 to 9, the exchange service robot 400 or the exchange service system may provide the convenient exchange service convenient to the users who use the overseas transportation management facility, thereby enabling the users to conveniently deal with the remaining currency.

In addition, the exchange service robot 400 or the exchange service system may provide the exchange service for exchanging the currency for not only various types of real currencies but also various currencies such as an electronic currency, a virtual currency, a cryptocurrency, etc., such that the user can conveniently exchange the residual currency for a desired type of currency.

Figure 10:
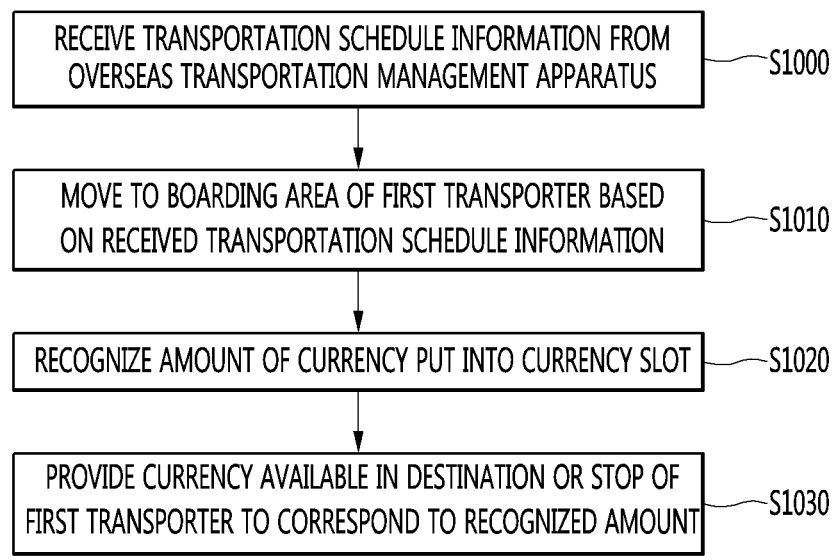
FIG. 10 is a flowchart illustrating operation of providing an exchange service based on transportation scheduling information at an exchange service robot according to an embodiment of the present invention.

FIG. 10 is a flowchart illustrating operation of providing an exchange service based on transportation scheduling information at an exchange service robot according to an embodiment of the present invention.

Referring to FIG. 10, the exchange service robot 400 may receive transportation schedule information from the overseas transportation management apparatus 600 of the overseas transportation management facility (S1000).

The overseas transportation management apparatus 600 may transmit the transportation schedule information of the transporters of the overseas transportation management facility to the exchange service robot 400.

The transportation schedule information may include information on the departure time, a boarding area and a destination (and stop) of each of a plurality of transporters. For example, when the overseas transportation management facility is an airport, the transportation schedule information may include information on a boarding (or a takeoff) time, a boarding gate and a destination (and stop) of each airplane.

In some embodiments, the transportation schedule information may further include an arrival time, a getting-off area and a departure (and stop) of each transporter arriving at the overseas transportation management facility.

The overseas transportation management apparatus 600 may integrally transmit the transportation schedule information during a predetermined period (e.g., one day) to the exchange service robot 400 or may transmit only the transportation schedule information of any one transporter to the exchange service robot 400.

The exchange service robot 400 may move to an area corresponding to the boarding area of a first transporter of the plurality of transporters based on the received transportation schedule information (S1010).

The processor 480 may control the traveling unit 462 such that the robot moves to an area corresponding to the boarding area of the first transporter of the plurality of transporters from the received transportation schedule information.

For example, the processor 480 may control the traveling unit 462 such that the robot moves to the area corresponding to the boarding area (or the getting-off area) of the first transporter having a departure time (or an arrival time) closest to the current time.

Alternatively, the processor 480 may control the traveling unit 462 such that the robot moves to the area corresponding to the boarding area (or the getting-off area) of the first transporter in a boarding area (or a getting-off area) closest to the current position of the exchange service robot 400.

Alternatively, the processor 480 may control the traveling unit 462 such that the robot moves to the area corresponding to the boarding area (or the getting-off area) of the first transporter traveling to a destination (or stop) where a currency withdrawable from the exchange service robot 400 may be available.

Alternatively, the processor 480 may control the traveling unit 462 such that the robot moves to the area corresponding to the getting-off area of the first transporter arriving from the departure (or stop) where a currency puttable into the exchange service robot 400 may be available.

As described above, the processor 480 may control the traveling unit 462 to select any one transporter in various manners and enable the robot to move to the area corresponding to the boarding area (or the getting-off area) of the selected transporter. Meanwhile, in addition to the above-described methods, the processor 480 may control the traveling unit 462 through various methods based on the transportation schedule information, such that the robot moves to the area corresponding to the boarding area (or the getting-off area) of any one transporter.

The exchange service robot 400 may recognize the amount of currency put into the currency slot 402 in the moved area (S1020). The exchange service robot 400 may provide the currency available in the destination or stop of the first transporter based on the transportation schedule information to correspond to the recognized amount of currency (S1030).

For example, when the exchange service robot 400 moves to the area corresponding to the boarding area of the first transporter, users who use the first transporter may exchange a currency available in a country where the overseas transportation management facility is located for a currency available in a country where the destination (stop) of the first transporter is located.

That is, the currency put into the exchange service robot 400 by a user who uses the exchange service may be available in the country where the overseas transportation management facility is located.

Accordingly, the processor 480 may automatically set the type of the currency to be put into the currency slot 402 and the type of the currency to be withdrawn, when providing the exchange service.

Based on this, the processor 480 may recognize the amount of currency put into the currency slot 402 and provide a currency available in the destination (or stop) to correspond to the recognized amount of currency. As described above, the withdrawn currency may include not only a real currency but also an electronic currency, a virtual currency, a cryptocurrency, etc.

In some embodiments, when the exchange service robot 400 moves to the area corresponding to the getting-off area of a specific transporter, users who use the specific transporter may exchange a currency available in the country of the departure (or stop) of the specific transporter for a currency available in the country where the overseas transportation management facility is located. Accordingly, the processor 480 may recognize the type of currency put into the currency slot 402 in advance when the exchange service is provided. Based on this, the processor 480 may recognize the amount of currency put into the currency slot 402 and provide the currency available in the country where the overseas transportation management facility is located to correspond to the recognized amount of currency.

That is, the exchange service system may move the position of the robot to more efficiently provide the exchange service using the exchange service robot 400 based on the transportation schedule information.

In the related embodiment, when a plurality of exchange service robots for providing different types of currencies is present, the exchange service system may move the plurality of exchange service robots to optimal positions according to destination information of the transportation schedule information. For example, assume that a first exchange service robot provides dollars and a second exchange service robot provides Euros. In this case, the first exchange service robot may move to the boarding area of a transporter having America as a destination to provide the exchange service and the second exchange service robot may move to the boarding area of a transporter having Europe as a destination to provide the exchange service. Therefore, it is possible to provide optimal exchange services in the overseas transportation management facility where transporters moved to various countries are managed.

Figure 11:
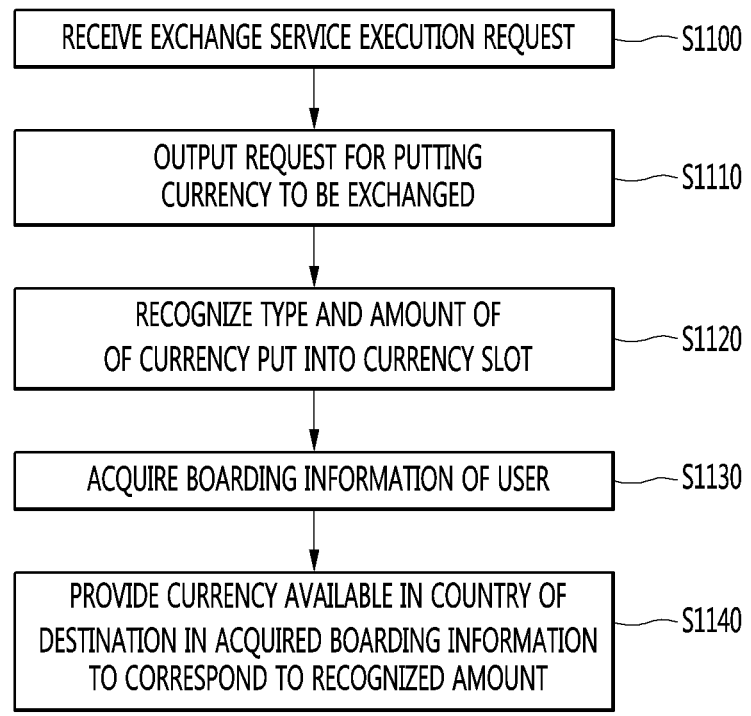
FIG. 11 is a flowchart illustrating operation of providing an exchange service based on boarding information of a user at an exchange service robot according to an embodiment of the present invention.

FIG. 11 is a flowchart illustrating operation of providing an exchange service based on boarding information of a user at an exchange service robot according to an embodiment of the present invention.

Referring to FIG. 11, the exchange service robot 400 may receive an exchange service execution request (S1100), and output a request for putting a currency to be exchanged (S1110). The exchange service robot 400 may recognize the type and amount of currency put into the currency slot 402 (S1120).

Steps S1100 to S1120 are substantially equal to steps S600 to S620 of FIG. 6 and thus a description thereof will be omitted.

The exchange service robot 400 may acquire boarding information of a user who uses the exchange service (S1130).

For example, the exchange service robot 400 may include a scanner (not shown) for scanning the boarding ticket of the user to acquire the boarding information from the boarding ticket.

Alternatively, the processor 480 may acquire the boarding information of the user through the input unit 420 or acquire the boarding information from the terminal of the user through the communication unit 410.

When the user moves from a country where the overseas transportation management facility is located to another country, the boarding information may include a transporter (e.g., flight number), a boarding time, a destination, etc.

The exchange service robot 400 may provide a currency available in the country of the destination in the acquired boarding information to correspond to the recognized amount of currency (S1140).

The processor 480 may check the currency available in the country of the destination based on the destination of the user included in the acquired boarding information. In some embodiments, when a plurality of types of currencies is checked, the processor 480 may receive, from the user, input of selecting any one of the checked currencies.

The processor 480 may calculate the withdrawal amount of the checked currency based on the exchange rate information between the currency recognized in step S1120 and the checked currency.

The processor 480 may provide the currency corresponding to the calculated withdrawal amount through the currency outlet 404.

That is, according to the embodiment shown in FIG. 11, the exchange service robot 400 may automatically select the type of the currency to be withdrawn based on the boarding information of the user who uses the exchange service. Therefore, it is possible to more rapidly provide the exchange service and to improve convenience of the user who uses the exchange service.

Figure 12:
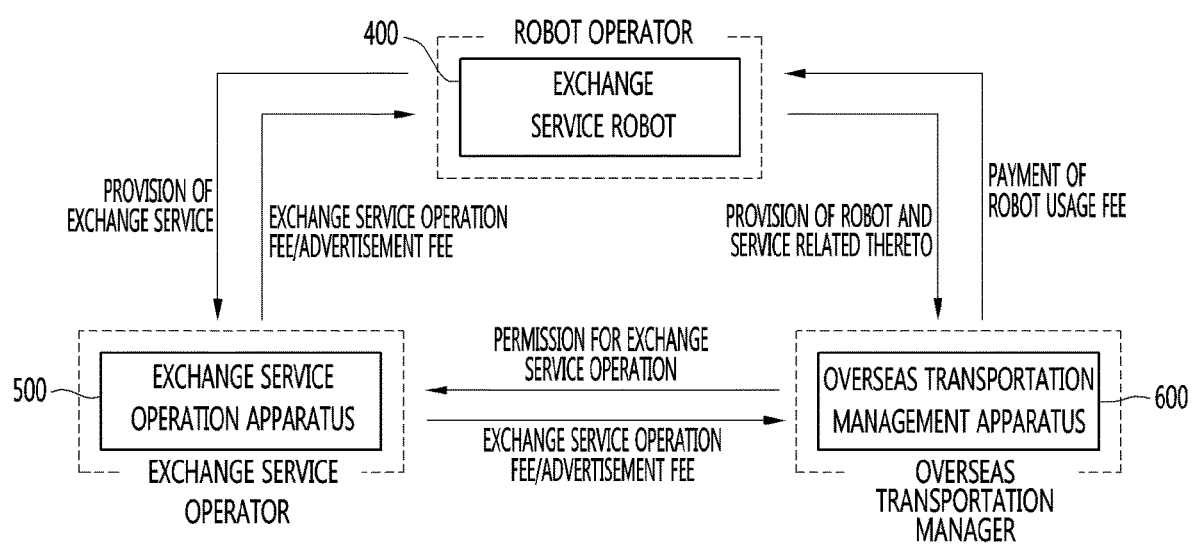
FIG. 12 is a view schematically illustrating a business model among a robot operator, an exchange service operator and an overseas transportation manager according to an embodiment of the present invention.

FIG. 12 is a view schematically illustrating a business model among a robot operator, an exchange service operator and an overseas transportation manager according to an embodiment of the present invention.

Referring to FIG. 12, a robot operator (or a robot manufacturer) for operating and managing the exchange service robot 400 may provide the exchange service operated by an exchange service operator to the users of the overseas transportation management facility. To this end, the exchange service APP 482 distributed or updated by the exchange service operation apparatus 500 may be installed in the exchange service robot 400. The robot operator may acquire an operation fee or an advertisement fee according to provision of the exchange service from the exchange service operator.

In addition, the overseas transportation manager of the overseas transportation management facility may permit the exchange service operator to operate the exchange service in the overseas transportation management facility and acquire the operation fee or the advertisement fee from the exchange service operator.

Meanwhile, the robot operator may provide the overseas transportation management facility with the exchange service robot 400, thereby providing users with various services such as the exchange service. The overseas transportation manager may pay the robot operator for usage of the exchange service robot 400.

According to the embodiment of the present invention, an exchange service robot and an exchange service system including the same can provide a convenient exchange service to users who use an overseas transportation management facility such as an airport, thereby providing convenience for dealing with remaining currencies of the users.

In addition, the exchange service robot and the exchange service system including the same can provide the exchange service for exchanging currency for not only various types of real currencies but also various currencies such as ab electronic currency, a virtual currency, a cryptocurrency, etc., such that the users can conveniently exchange remaining currencies for desired types of currencies.

In addition, the exchange service robot can provide the exchange service while moving to an area where the exchange service is highly likely to be used based on transportation schedule information of an overseas transportation management facility. Therefore, it is possible to more efficiently provide the exchange service using the exchange service robot and improve the utilization rate of the exchange service. In addition, users of the overseas transportation management facility may conveniently use the exchange service in a boarding area or a getting-off area of the transporter without moving to a separate place in order to use the exchange service.

In addition, the exchange service robot can automatically select the type of currency to be withdrawn based on boarding information of a user who uses the exchange service. Accordingly, it is possible to more rapidly provide the exchange service and improve convenience of the user who uses the exchange service.

The foregoing description is merely illustrative of the technical idea of the present invention, and various changes and modifications may be made by those skilled in the art without departing from the essential characteristics of the present invention.

Therefore, the embodiments disclosed in the present invention are to be construed as illustrative and not restrictive, and the scope of the technical idea of the present invention is not limited by these embodiments.

The scope of the present invention should be construed according to the following claims, and all technical ideas within equivalency range of the appended claims should be construed as being included in the scope of the present invention.

What is claimed is:

1. An exchange service robot comprising:
a communication unit;
a traveling unit including at least one wheel and a traveling motor;
an output unit configured to output a request for putting a currency;
a currency recognition sensor configured to recognize the amount of currency put through a currency slot; and
a processor configured to acquire information on a withdrawal amount based on exchange rate information between the put currency and a currency to be withdrawn and the amount of put currency, and provide the currency to be withdrawn based on the acquired information,
wherein the exchange service robot is disposed in an overseas transportation management facility, and
wherein the processor is further configured to:
receive transportation schedule information from an overseas transportation management apparatus of the overseas transportation management facility; and
control the traveling unit, for movement to any one of a plurality of boarding areas or a plurality of getting-off areas in the overseas transportation management facility based on the received transportation schedule information.

2. The exchange service robot according to claim 1, further comprising an input unit configured to receive input of selecting a type of the currency to be withdrawn,
wherein the type of the currency to be withdrawn includes at least one of a real currency available in at least one country, an electronic currency, a virtual currency, a cryptocurrency, mileage or points.

3. The exchange service robot according to claim 2, wherein, when the currency of the type selected through the input unit is a real currency, the processor is further configured to perform control such that the real currency corresponding to the withdrawal amount is withdrawn through a currency outlet.

4. The exchange service robot according to claim 2, wherein, when the currency of the selected type is not a real currency, the processor is further configured to transmit information on the withdrawal amount to an exchange service operation apparatus to transfer the currency corresponding to the withdrawal amount to an account of a user related to the currency of the selected type.

5. The exchange service robot according to claim 2, wherein the processor is further configured to:
transmit information including the amount of put currency and the type of the currency to be withdrawn to an exchange service operation apparatus,
receive information on the calculated withdrawal amount from the exchange service operation apparatus, and
provide the currency to be withdrawn based on the received information.

6. The exchange service robot according to claim 1, wherein the processor is further configured to:
receive exchange rate information from an exchange service operation apparatus, and
update exchange rate information stored in a memory to the received exchange rate information.

7. The exchange service robot according to claim 1, wherein the processor is further configured to:
receive an exchange service execution request from a terminal of a user through the communication unit, and
control the traveling unit, for movement to a position corresponding to position information based on the position information included in the received exchange service execution request.

8. The exchange service robot according to claim 1,
wherein the transportation schedule information includes first transportation schedule information including a departure time, a boarding area and a destination of each of a plurality of transporters or second transportation schedule information including an arrival time, a getting-off area and a departure of each of a plurality of transporters, and
wherein the processor is further configured to control the traveling unit, for movement to an area corresponding to a boarding area or a getting-off area of a first transporter among the plurality of transporters based on the transportation schedule information.

9. The exchange service robot according to claim 8, wherein the processor is further configured to automatically set the currency to be withdrawn to a currency available in a destination of the first transporter based on the first transportation schedule information.

10. The exchange service robot according to claim 8, wherein the processor is further configured to automatically set the currency to be withdrawn to a currency available in a country where the overseas transportation management facility is located, based on the second transportation schedule information.

11. The exchange service robot according to claim 8, wherein the processor is further configured to control the traveling unit, for movement to an area corresponding to a boarding area of the first transporter having a departure time closest to a current time among the plurality of transporters or a getting-off area of the first transporter having an arrival time closest to the current time among the plurality of transporters.

12. The exchange service robot according to claim 8, wherein the processor is further configured to control the traveling unit, for movement to an area corresponding to a boarding area or a getting-off area of the first transporter having a boarding area or a getting-off area closest to a current position of the exchange service robot among the plurality of transporters.

13. The exchange service robot according to claim 8, wherein the processor is further configured to:
recognize the first transporter traveling to a destination where a currency providable by the exchange service robot is available, among the plurality of transporters, and
control the traveling unit, for movement to an area corresponding to a boarding area of the first transporter.

14. An exchange service method using an exchange service robot, the exchange service method comprising:
receiving an exchange service execution request;
recognizing the amount of currency put through a currency slot of the exchange service robot;
acquiring information on a type of a currency to be withdrawn;
calculating a withdrawal amount based on exchange rate information between the put currency and the currency to be withdrawn and the recognized amount of put currency; and
providing the currency to be withdrawn corresponding to the calculated withdrawal amount, wherein the exchange service robot is disposed in an overseas transportation management facility, wherein the exchange service method further includes:

acquiring transportation schedule information from an overseas transportation management apparatus of the overseas transportation management facility; and moving the exchange service robot to any one of a plurality of boarding areas or a plurality of getting-off areas in the overseas transportation management facility based on the acquired transportation schedule information.

15. The exchange service method according to claim 14, wherein the providing of the currency to be withdrawn includes:

when the currency to be withdrawn is a real currency, providing a real currency corresponding to the withdrawal amount through a currency outlet of the exchange service robot; and when the currency to be withdrawn is not a real currency, transferring the currency corresponding to the withdrawal amount to an account of a user related to the currency to be withdrawn.

16. The exchange service method according to claim 14, wherein the receiving of the exchange service execution request includes:

receiving, from a terminal of a user, the exchange service execution request including position information of the user; and moving the exchange service robot to a position corresponding to the position information.

17. The exchange service method according to claim 14, wherein the transportation schedule information includes first transportation schedule information including a departure time, a boarding area and a destination of each of a plurality of transporters or second transportation schedule information including an arrival time, a getting-off area and a departure of each of a plurality of transporters.

18. The exchange service method according to claim 14, wherein the overseas transportation management facility includes at least one of an airport, a railway station, a ferry terminal or a bus terminal.

* * * * *